(12) United States Patent
Lahr et al.

(10) Patent No.: US 11,133,724 B2
(45) Date of Patent: Sep. 28, 2021

(54) ROTOR WITH COMPRESSIVE STRUCTURAL ELEMENTS

(71) Applicant: GM GLOBAL TECHNOLOGY OPERATIONS LLC, Detroit, MI (US)

(72) Inventors: Derek F. Lahr, Howell, MI (US); Alireza Fatemi, Canton, MI (US); Farzad Samie, Franklin, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 97 days.

(21) Appl. No.: 16/580,427

(22) Filed: Sep. 24, 2019

(65) Prior Publication Data

US 2021/0091630 A1 Mar. 25, 2021

(51) Int. Cl.
*H02K 7/04* (2006.01)
*H02K 1/27* (2006.01)
*H02K 1/24* (2006.01)

(52) U.S. Cl.
CPC ............. *H02K 7/04* (2013.01); *H02K 1/246* (2013.01); *H02K 1/276* (2013.01)

(58) Field of Classification Search
CPC ........... H02K 7/04; H02K 1/276; H02K 1/246
USPC .......................................................... 310/91
See application file for complete search history.

(56) References Cited

U.S. PATENT DOCUMENTS

| 5,296,773 | A | 3/1994 | El-Antably et al. |
| 6,674,205 | B2 | 1/2004 | Biais et al. |
| 7,474,029 | B2 | 1/2009 | Rahman et al. |
| 8,138,651 | B2 | 3/2012 | Rahman et al. |
| 8,487,494 | B2 | 7/2013 | Jurkovic et al. |
| 8,860,275 | B2 | 10/2014 | Kaiser et al. |
| 8,884,485 | B2 | 11/2014 | Jurkovic et al. |
| 8,928,197 | B2 | 1/2015 | Jurkovic et al. |
| 8,933,606 | B2 | 1/2015 | Rahman et al. |
| 8,957,563 | B2 | 2/2015 | Rahman et al. |
| 9,118,230 | B2 | 8/2015 | Jurkovic et al. |
| 2012/0236558 | A1* | 9/2012 | Roudeski .................. B64F 1/20 362/235 |
| 2013/0147302 | A1 | 6/2013 | Rahman et al. |
| 2015/0108866 | A1* | 4/2015 | Kaiser ...................... H02K 1/28 310/156.08 |
| 2018/0152066 | A1 | 5/2018 | Li et al. |

OTHER PUBLICATIONS

D. Vimalakeerthy. (Nov. 2012). Permanent Magnet Synchronous Reluctance Motor Design Enhancement Using Finite Element Method. International Journal of Engineering and Innovative Technology. vol 2, Issue 5.

* cited by examiner

*Primary Examiner* — Terrance L Kenerly

(74) *Attorney, Agent, or Firm* — Lorenz & Kopf LLP

(57) ABSTRACT

A rotor for an electric machine includes a rotor core having at least one internal cavity. A pair of features are defined by the rotor core and extend into the cavity. A structural element is compressed between the features so that a preload may be established between the features and the structural element.

20 Claims, 9 Drawing Sheets

ROTOR WITH COMPRESSIVE STRUCTURAL ELEMENTS

INTRODUCTION

The present invention relates to electric machines and rotors thereof, and more particularly relates to a rotor with a multitude of internal cavities, which may house permanent magnets or function as magnetic flux barriers, with a feature of compressive structural elements for high performance operation.

A rotor, such as for an interior permanent magnet (IPM) machine or a synchronous reluctance (SR) machine, includes a rotor core assembled around the rotation shaft. Such a rotor with segmental construction typically includes a number of stacked laminations forming a core body. The core body typically includes cavities as flux barriers to influence operational characteristics of the machine. The laminations of the core body are formed in a disc shape with a center opening for assembly on a rotation shaft. The flux barriers are distributed around the shaft opening, typically have ends adjacent to the circumference of the lamination, and extend typically toward the shaft opening. The flux barrier cavities may or may not include magnets.

The physical dimensions, number and positioning of the flux barrier cavities influence the performance of an electric machine. Accordingly, even a large flux barrier placed in a non-optimum position may not result in optimal performance. In addition, synchronous reluctance machines are particularly susceptible to flux leakage through lamination features around the flux barriers that may be structurally required. These factors lead to flux barrier design and positioning that results in only thin structural features being left to support parts of the rotor core. These thin lamination features may limit the performance and speeds achievable by the electric machine without overly stressing the rotor core, or without overly increasing feature size. Due to the presence of the flux barrier cavities, the rotor may be structurally weakened and thus may be unsuitable for high speed applications.

Accordingly, it is desirable to provide economical rotors for electric machines that achieve high performance with minimal structural feature size. Furthermore, other desirable features and characteristics of the present invention will become apparent from the subsequent detailed description and the appended claims, taken in conjunction with the accompanying drawings and the foregoing technical field and background.

SUMMARY

In various embodiments, a rotor for an electric machine includes a rotor core that has at least one internal cavity. The internal cavity is surrounded by a wall defined by the rotor core. A structural element is disposed in the cavity and is compressible between a pair of features of wall. A preload is established between the first and second wall features and the structural element.

In additional embodiments, the structural element comprises a magnet.

In additional embodiments, the structural element comprises a non-magnetic material.

In additional embodiments, the structural element includes a number of sides defining a number of corners, wherein the wall features comprise beams that engage the structural element at nonadjacent of the corners.

In additional embodiments, the non-adjacent of the corners comprise one corner disposed at a junction of a radially inward facing side and a radially outward facing side, and another corner disposed at a junction of another radially inward facing side and another radially outward facing side.

In additional embodiments, the structural element comprises a number of segments that wedge against the first and second wall features to establish the preload.

In additional embodiments, the segments comprise pentagonal and trapezoidal shapes.

In additional embodiments, the beams comprise a deformable material and the structural element is press fit between the beams to establish the preload.

In additional embodiments, the rotor includes a plurality of cavities. The cavities are in-part, defined by struts and bridges. The structural element is configured to offset loads otherwise carried by the struts and bridges.

In additional embodiments, at least one of the structural element and the rotor induces a wedging action on the structural element.

In a number of additional embodiments, a rotor for an electric machine includes a rotor core having a plurality of internal cavities that define poles of the rotor. A pair of wall features are defined by the rotor core extend into at least one of the cavities. A structural element is compressed between the wall features so that a preload is established between the wall features and the structural element.

In additional embodiments, the cavities are arranged in a number of layers and a strut extends through at least one of the layers to support the rotor core.

In additional embodiments, the structural element is disposed in one of the layers that has a larger open cross sectional area than the others of the layers. The layer with the structural element may have a thinner strut or may not include the strut.

In additional embodiments, the structural element comprises a magnet.

In additional embodiments, the structural element comprises a non-magnetic material.

In additional embodiments, the structural element includes a number of sides defining a number of corners. The wall features comprise beams that engage the structural element at nonadjacent corners that include one corner disposed at a junction of a radially inward facing side and a radially outward facing side, and another corner disposed at a junction of another radially inward facing side and another radially outward facing side.

In additional embodiments, the structural element comprises a number of segments that wedge against the first and second wall features to establish the preload. At least one of the segments comprises a trapezoidal shape.

In additional embodiments, the beams comprise a deformable material and the structural element is press fit between the beams to establish the preload.

In additional embodiments, the cavities are in-part defined by struts and bridges. The structural element is configured to offset loads otherwise carried by the struts and bridges.

In a number of other embodiments, a rotor for an electric machine includes a rotor core having a plurality of internal cavity groupings. Each of the cavity groupings includes plural cavities and defines a pole of the rotor. At least one strut is included in each of the cavity groupings for support of the rotor core. A pair of features defined by the rotor core extend into at least one of the cavities. A structural bar is compressed between the features. A preload is established between the features and the structural bar. The preload results in the structural bar applying a radially inward directed force to the rotor core to offset centrifugal loads on the strut.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As disclosed herein, rotors include core/lamination features that enable the use of compressive structural elements for the transfer of loads away from thin, relatively weak parts of the core to areas with higher load carrying capability. As used herein, the term structural element refers to a load carrying object without limitation. In addition, the term compressive does not require deformation of the structural element but means that a compressive load may be applied to the structural element and in response, the compressive structural element applies a preload to the core, wherein the preload may be zero or greater when the rotor is stationary. For example, a compressive structural element may be made of any material that is sufficiently rigid to carry the applied loads, and may be formed in any shape and configuration such as a bar, rod, block, tube and others. The compressive structural elements described herein may be included without negative impact to the rotor's magnetics. In some embodiments, the compressive structural elements may be a rotor's internal magnets themselves and may comprise magnetic bars. In other embodiments that do not include permanent magnets, a non-ferrous and/or non-conductive material may be used as a compressive structural element. In a number of embodiments, the compressive structural elements may comprise a number of assembled pieces/segments. The compressive load may be achieved through a number of approaches, such as a press fit, tapered elements, shaped segments, deformable lamination parts, or others. Higher rotor speed and desirable magnetic performance may be achieved while maintaining desirably thin and light lamination features such as struts and bridges, resulting in relatively low material cost, weight and compact size.

Figure 1:
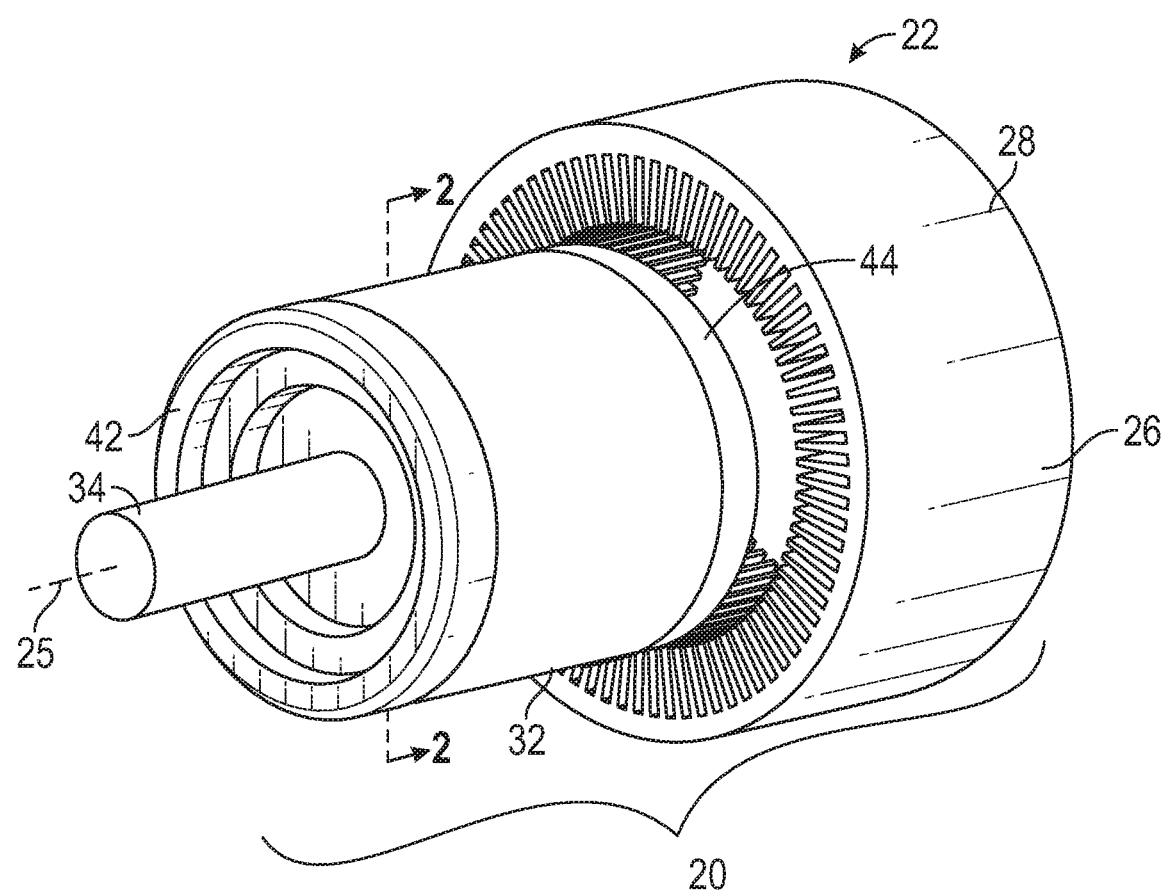
FIG. 1 is a schematic illustration of parts of an electric machine, in accordance with various embodiments.

With reference to FIG. 1, schematically illustrated are select components of an electric machine 20 including a stator assembly 22 and a rotor assembly 24 configured to rotate about an axis 25. In the illustration, the rotor assembly 24 is shown outside the stator assembly 22 for visibility. In this embodiment, the electric machine 20 is configured as a motor in which the current in the rotor assembly 24 that produces torque is induced from the magnetic field created by energization of the stator assembly 22. In a number of embodiments, the electric machine 20 is an alternating current machine suitable for use in applications requiring regulated speed control such as for a vehicle traction motor, although this disclosure is not limited to those applications.

The stator assembly 22 is a generally annular shaped component, which may be constructed for single-phase power or multiple phase power such as, three-phase. In this embodiment, the stator assembly 22 includes a core 26 made of a stack of laminations 28. The laminations 28 may be formed by stampings that are slotted to receive windings (not shown), and are made of a soft magnetic material such as silicon steel. The laminations 28 may be insulated from one another by a thin non-conductive coating. In other embodiments, another ferromagnetic material may be used. The stator assembly 22 may include the windings for energization.

The rotor assembly 24 includes a core 30 which includes a stack of laminations 32 configured to receive a shaft 34. The laminations 32 may be stamped or otherwise formed. The laminations 32 are made of a ferromagnetic material and may be insulated from one another by a thin non-conductive coating, or may be made of another material. End rings 42, 44 are formed at the ends of the core 30. In the current embodiment, the end rings 42, 44 are fabricated of an aluminum material for light weight. The rotor assembly 24 is configured with a number of poles to create the magnetic circuit of the rotor assembly 24, which depends on the angular position of the rotor assembly 24, for interacting with that induced by the stator assembly 22 of the electric machine 20. These poles may be created, at least in-part, by flux barriers as described below.

Figure 2:
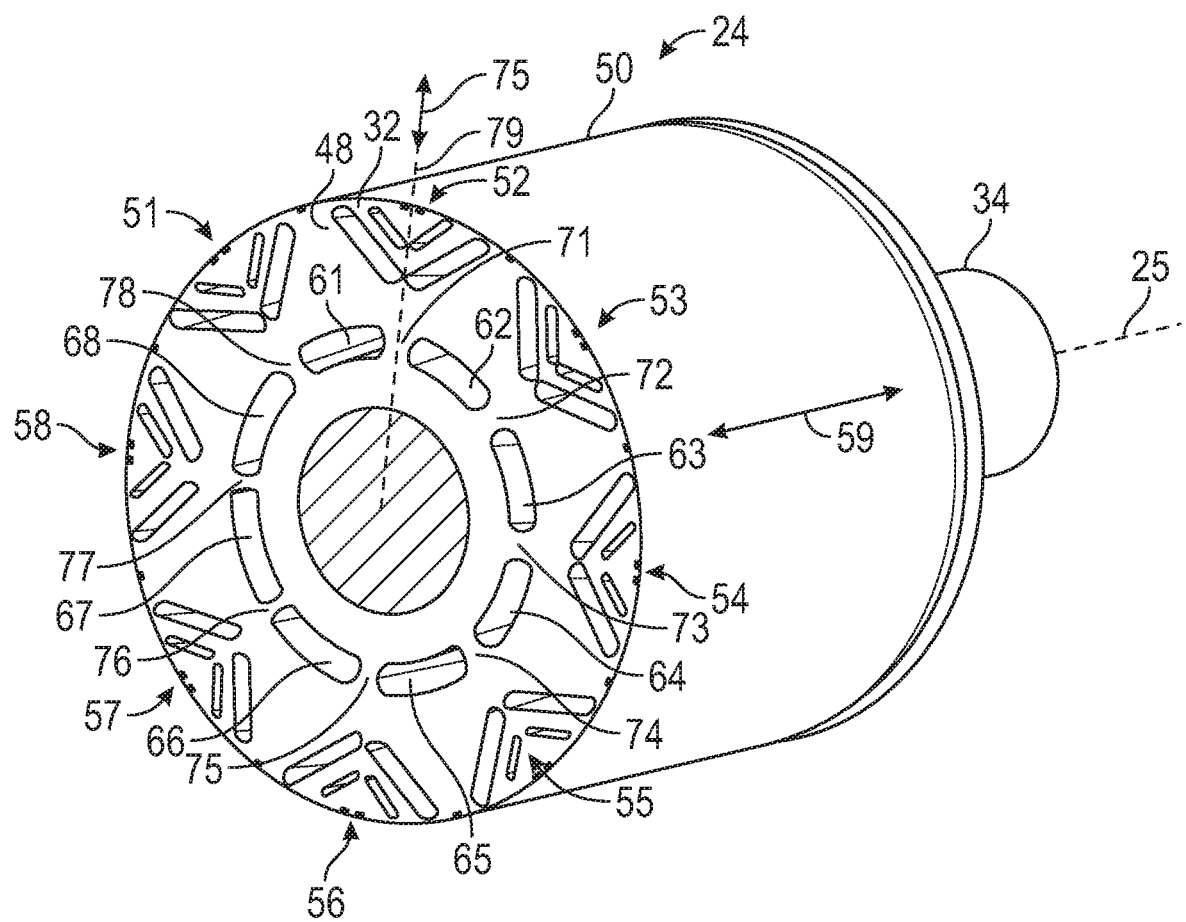
FIG. 2 is a fragmentary, cross sectional illustration of a rotor taken generally along the line 2-2 on the electric machine of FIG. 1, in accordance with various embodiments.

In FIG. 2, the rotor assembly 24 is shown in cross section with a side 48 of one of the laminations 32 exposed and visible. The lamination 32 includes a number of openings, referred to as cavities, that may serve multiple purposes. Distributed around the rotor assembly 24 near its outer perimeter 50 are eight cavity groups 51-58, each formed in two angled layers. The cavities in the cavity groups 51-58 extend through the stacked rotor laminations 32 of the core 30 in a longitudinal direction 59, which is parallel to the axis 25. The cavity groups 51-58 operate as barriers to magnetic flux and help define the magnetic poles of the rotor assembly 24. Accordingly, in the current embodiment, the rotor assembly 24 has eight poles. The rotor assembly 24 also includes a layer of openings 61-68 arrayed to encircle the shaft 34 and disposed part-way between the shaft 34 and the opening groups 51-58 in the radial direction 75. The openings 61-68 are each oriented angularly in-between an adjacent pair of cavity groups 51-58 leaving a series of webs 71-78, each oriented along a radial line extending from the axis 25 in the radial direction 75 that bisects one of the cavity groups 51-58, such as the radial line 79 of the cavity group 52. The openings 61-68 may operate to concentrate the flux lines in the rotor assembly 24 radially at the eight poles.

Figure 3:
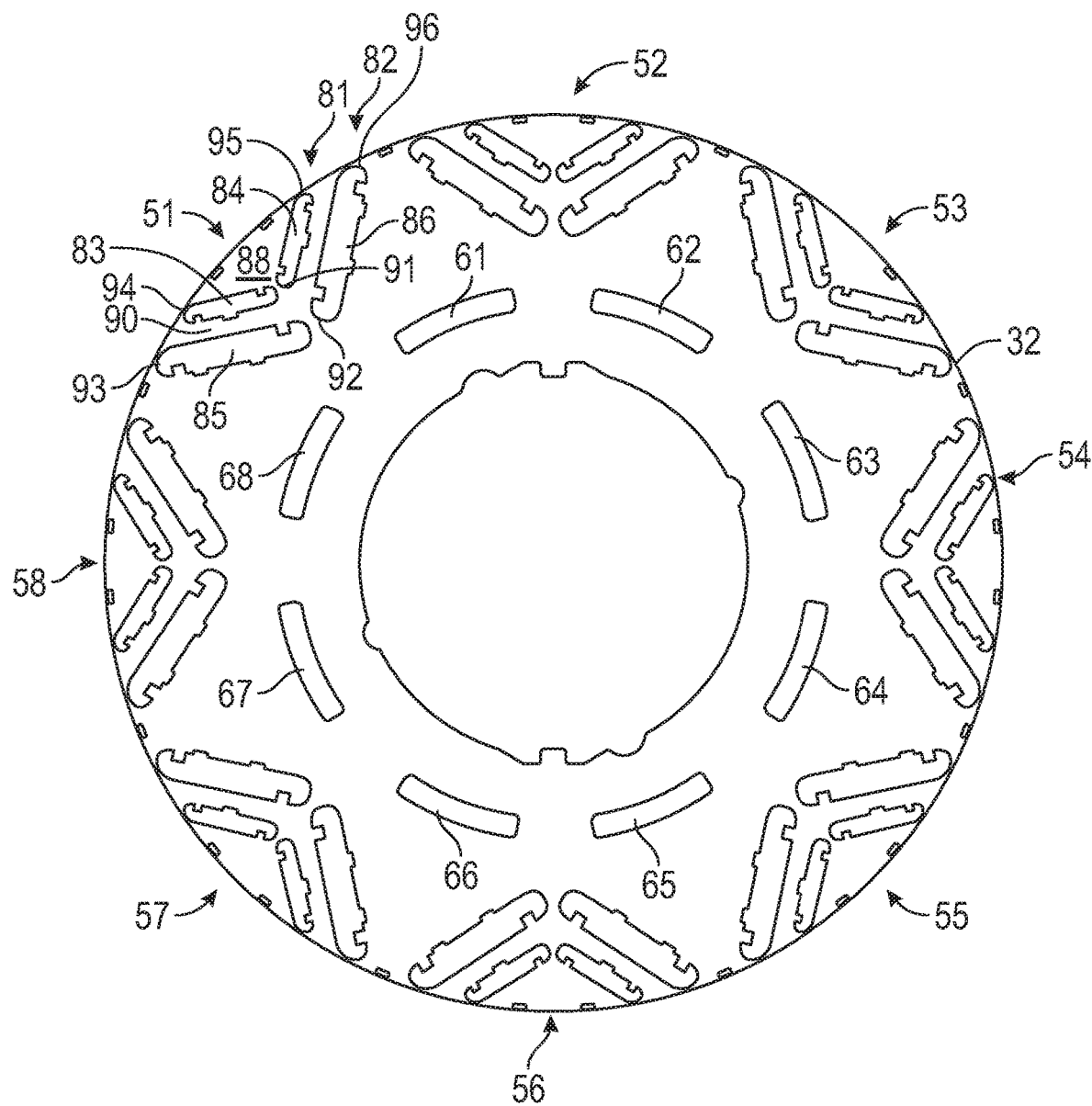
FIG. 3 is a plan view of a lamination of the rotor of FIG. 2, in accordance with various embodiments.

Referring to FIG. 3, one lamination 32 of the rotor assembly 24 is shown. Each of the cavity groups 51-58 is similar and the details of cavity group 51 will be described with the understanding that the other cavity groups 52-58 include like elements. The cavity group 51 includes two layers 81, 82 of flux barriers, which in the current embodiment of an IPM motor will be referred to as magnet cavities. The layers 81, 82 include four magnet cavities 83-86, which are shown without magnets for simplicity. The magnet cavities 83, 84 form the outer layer 81 and are disposed at an angle relative to one another defining a sector shaped flux path element 88 through a remaining generally triangular steel section of the lamination 32. The magnet cavities 85, 86 form the inner layer 82 and are also disposed at an angle relative to one another. A vee shaped flux path element 90 is defined between the layers 81, 82 by a remaining steel section of the lamination 32. The layers 81, 82 define structural features of the remaining steel of the lamination 32 in the form of struts 91, 92 and bridges 93-96. The struts 91, 92 and the bridges 93-96 hold the outer sections of the lamination 32, such as the flux path elements 88, 90, together against rotationally induced forces during operation of the electric machine 20.

Figure 4:
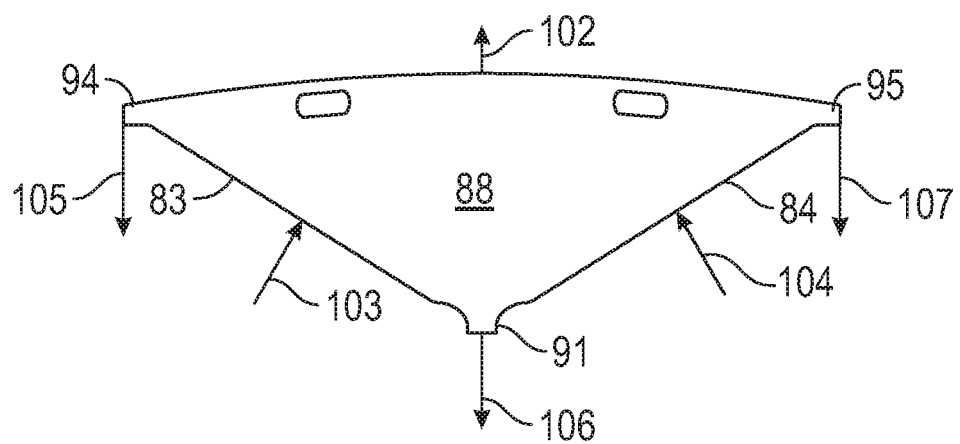
FIGS. 4-5 are fragmentary free-body illustrations of parts of a lamination without compressive structural elements, in accordance the prior art.

FIG. 4 depicts a free body diagram of the sector shaped flux path element 88 according to a prior art arrangement that does not include a compressive structural element. As the rotor assembly 24 turns, centrifugal force 102 acting on the lamination 32 is exerted on the flux path element 88 in a radially outward direction attempting to move the flux path element 88 away from the center of the rotor assembly 24. In addition magnets (not shown) in the magnet cavities 83, 84 may apply magnet forces 103, 104 arising due to centrifugal force acting on the contained magnets. The strut 91 and the bridges 94, 95 hold the flux path element 88 in place against the centrifugal and magnet forces 102-104. The strut 91 and bridges 94, 95 carry loads 105-107 respectively, to offset the forces 102-104, and they do so in proportion to their stiffness. The strut 91 may be significantly stiffer that the bridges 94, 95. The strut 91 and the bridges are limiting factors on the performance of the rotor assembly 24 because centrifugal forces cannot be generated in excess of their load carrying capability. Concurrently, the size of the strut 91 and bridges 94, 95 impacts the magnetic performance of the rotor assembly 24 and therefore, their size is limited.

Figure 5:
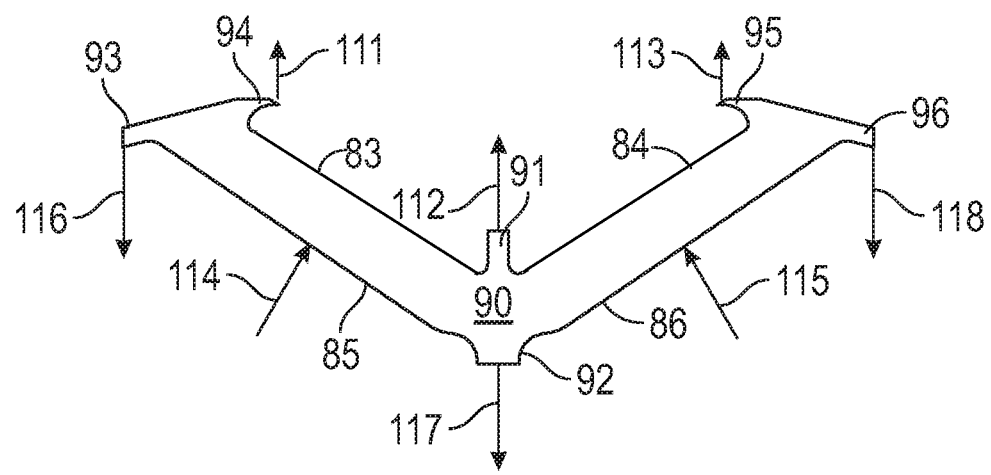

FIG. 5 similarly depicts a free body diagram of the vee shaped flux path element 90 according to a prior art arrangement that does not include a compressive structural element. As the rotor assembly 24 turns, centrifugal forces 111-113 acting on the lamination 32 are exerted on the flux path element 90 in a radially outward direction attempting to move the flux path element 90 away from the center of the rotor assembly 24. In addition magnets in the magnet cavities 85, 86 apply magnet forces 114, 115 arising due to centrifugal force acting on the contained magnets (not shown). The strut 91 and the bridges 93, 96 hold the flux path in place against the centrifugal and magnet forces 102-104. The strut 91 and bridges 93, 96 carry loads 116-118 respectively, and they do so in proportion to their stiffness.

In the diagrams of FIGS. 4-5, the struts 91, 92 may be significantly stiffer that the bridges 93-96. The struts 91, 92 and the bridges 93-96 are limiting factors on the performance of the rotor assembly 24 because centrifugal forces cannot be generated in excess of their load carrying capability. In addition, it is desirable to maintain the struts 91, 92 and the bridges as thin as possible so simply increasing their size to carry more loads is not a preferred approach.

Figure 6:
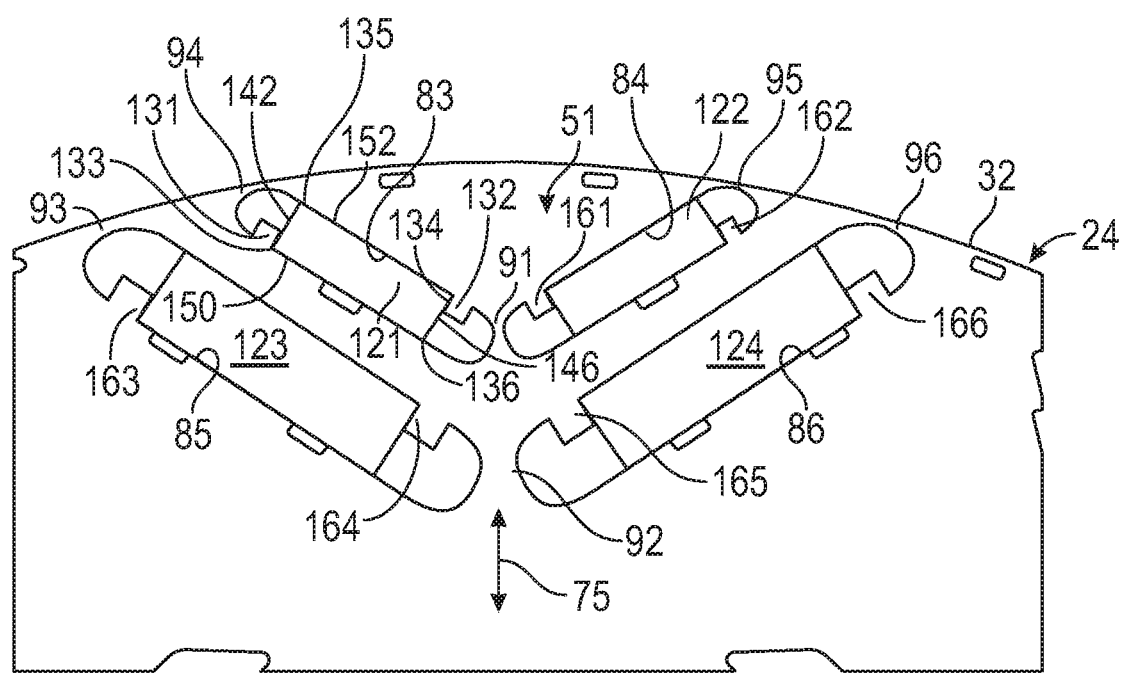
FIG. 6 is a fragmentary illustration of the rotor of FIG. 2, in accordance with various embodiments.

Referring to FIG. 6, the area of the rotor assembly 24 around the cavity group 51 is shown. The magnet cavities 83-86 contain compressive structural elements, which in the current embodiment are embodied as magnets 121-124. Each of the magnets 121-124 extends in the axial direction 59 through its respective cavity and may be shaped like a bar with a rectangular cross section that has an extending length. Accordingly, the structural element in this example may be referred to as a structural bar or a magnet bar. The current embodiment incorporates magnet retention features to redirect loads away from the struts 91, 92 and/or the bridges 93-96. In particular, the magnets 121-124 are placed in a compressed state resulting in loads being carried through the magnets and away from select parts of the laminations 32 of the rotor assembly 24. The retention features of each magnet 121-124 includes a pair of wall features cantilevered into the magnet cavities 83-86. The wall features are formed by aligned tabs of each individual stacked laminations 32 and run the length of the lamination stack of the rotor core 30 resulting in beam-like structures. For example, beams 131 and 132 engage the magnet 121 on nonadjacent corners 133, 134 respectively. Non-adjacent in this example, means that the corners do not have a common side.

Figure 7:
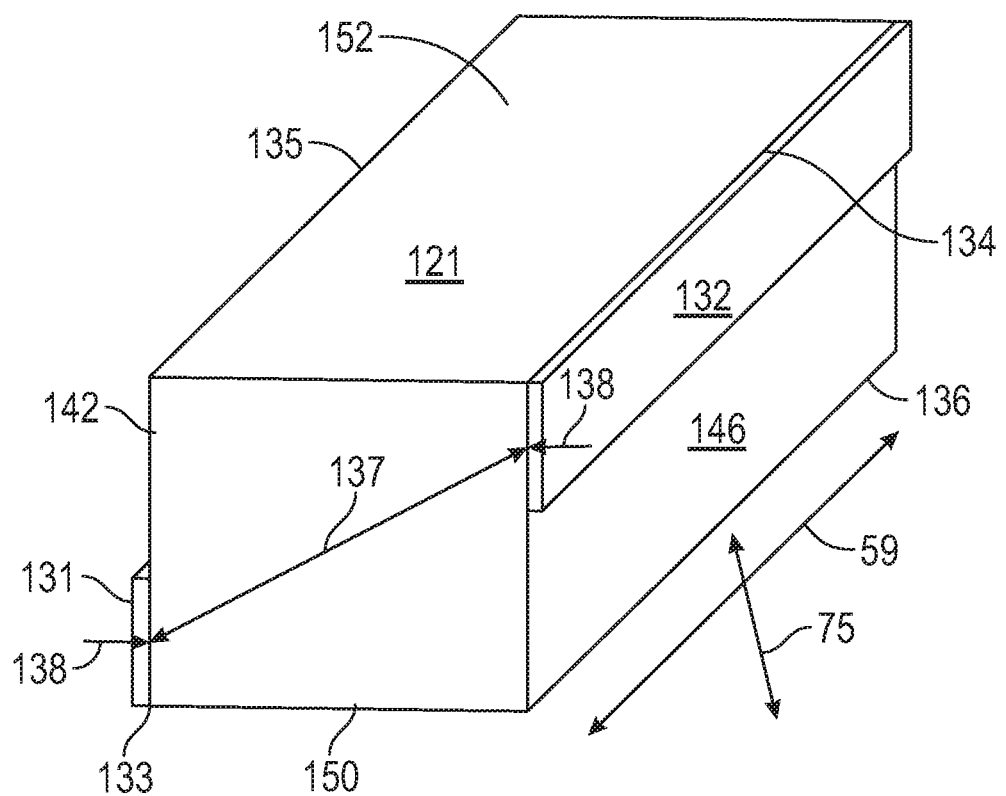
FIG. 7 is a fragmentary, schematic illustration of beams and a compressive structural element of FIG. 6 shown in isolation, in accordance with various embodiments.

The beams 131, 132 and magnet 121 are shown in isolation in FIG. 7. The magnet 121 is configured as a structural bar that has an elongated rectangular shape in this example. The magnet 121 has four corners 133-136 that extend along the axial direction 59. The beam 131 engages the magnet 121 at the corner 133 and the beam 132 engages the magnet 121 at the corner 134. A compressive preload 138 is applied to the magnet 121 by the beams 131, 132. A load path 137 exists between the beams 131, 132 and through the magnet 121 through which the magnet 121 applies a reaction force to the beams 131, 132. The reaction force through the load path 137 has a component in the radial direction 75 and therefore, the magnet 121 applies loads with a radially directed component that may be tailored to offset centrifugal forces on select parts of the rotor core 30.

Referring again to FIG. 6, the flux path element 88 side of the magnet 121 is retained by the beam 132, which extends as a wall feature from the flux path element 88. Similarly, the flux path element 90 side of the magnet 121 is retained by the beam 131, which extends from the flux path element 90 as a wall feature. The flux path element 88 side of the magnet 121 is the radially outward facing side 152 of the magnet 121 that faces (at an angle), generally in the radial direction 75 away from the axis 25 (FIG. 2) and that abuts the flux path element 88. The flux path element 90 side of the magnet 121 is the radially inward facing side 150 of the magnet 121 that faces (at an angle), generally in the radial direction 75 toward the axis 25 (FIG. 2) and that abuts the flux path element 90. The magnet 121 also includes a radially outward facing side 142, disposed between the sides 150-152, and includes a radially inward facing side 146, disposed opposite the radially outward facing side 142 and between the sides 150, 152. The corner 133 is at common edges of, and is formed by the junction between, the radially outward facing side 142 and the radially inward facing side 150 of the magnet 121. The corner 134 is at common edges of, and is formed by the junction between, the radially inward facing side 146 and the radially outward facing side 152 of the magnet 121. The corners 135, 136 do not have engaged wall features. The magnets 122-124 are similarly retained by their respective beams 161-162, 163-164 and 165-166, where the magnets 122-124 are each retained by wall features at a pair on non-adjacent corners where one corner is at a junction of a radially inward facing side and a radially outward facing side, and the other corner is at a junction of a different radially inward facing side and a different radially outward facing side.

Figure 8:
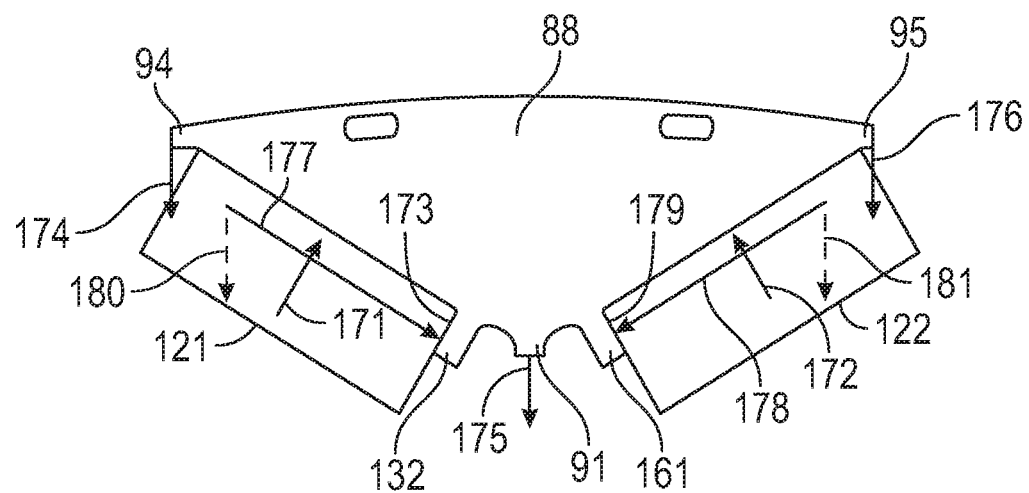
FIGS. 8-9 are fragmentary free-body illustrations of parts of the lamination of FIG. 3 with compressive structural elements of FIG. 6, in accordance with various embodiments.

Referring to FIG. 8, a free body diagram is shown of the sector shaped flux path element 88 of FIG. 6. Centrifugal force 170 and magnet forces 171, 172 act on the flux path element 88 when the rotor assembly 24 rotates. The forces 170-172 are balanced by the forces 174-176 at the strut 91 and the bridges 94, 95, and by forces 177, 178 through the magnets 121 122. The forces 177, 178 push on the flux path element 88 at the contact areas 173, 179 between the magnets 121, 122 and the flux path element 88. The forces 177, 178 include radially inward directed components 180, 181 due to the location of the beams 132, 161. As a result, the radially inward directed components 180, 181 assist the strut 91 and the bridges 94, 95 in countering the forces 174-176. As a result, the forces 174-176 are lower than they would be without the magnets 121, 122 acting as compressive structural elements where the magnets 121, 122 force the flux path element 88 radially inward.

Figure 9:
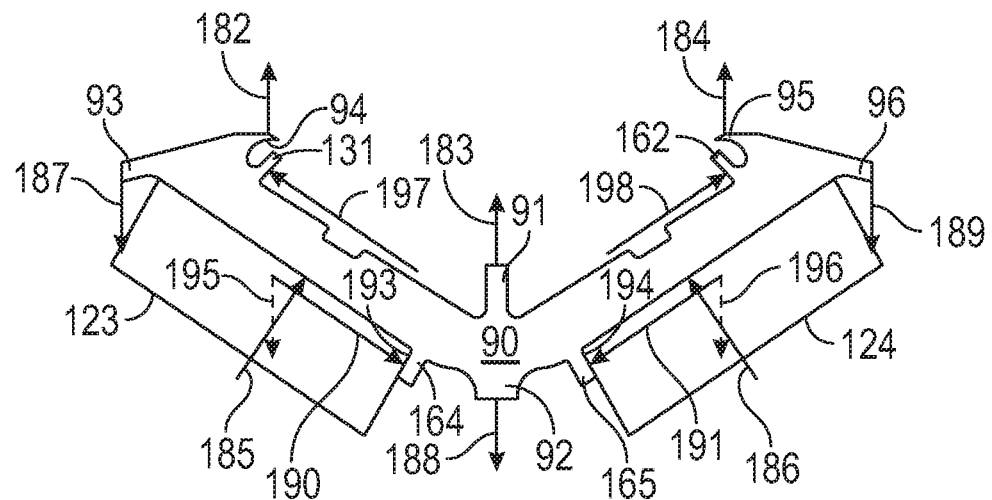

FIG. 9 shows a free body diagram of the vee shaped flux path element 90 of FIG. 6. Centrifugal forces 182-184 and magnet forces 185, 186 act on the flux path element 90 when the rotor assembly 24 rotates. The forces 182-186 are balanced by the forces 187-189 at the strut 92 and the bridges 93, 96, and by forces 190, 191 through the magnets 123 124. The forces 190, 191 push on the flux path element 90 at the contact areas 193, 194 between the magnets 123, 124 and the flux path element 90. The forces 190, 191 include radially inward directed components 195, 196 due to the location of the beams 164, 165. As a result, the radially inward directed components 195, 196 assist the strut 92 and the bridges 93, 96 in countering the forces 182-184. As a result, the forces 187-189 are lower than they would be without the magnets 123, 124 acting as compressive structural elements where the magnets 123, 124 force the flux path element 90 radially inward. The free body diagram indicates forces 197, 198 applied to the beams 161, 162 by the magnets 121, 122, which may have a radially outward directed component. However, the magnets 121, 122 are smaller than the magnets 123, 124, carry a smaller preload, and the forces 197, 198 are directed toward bridges which aren't as sensitive to loads as struts. Therefore the forces they apply are more than offset by the forces 190, 191.

Figure 10:
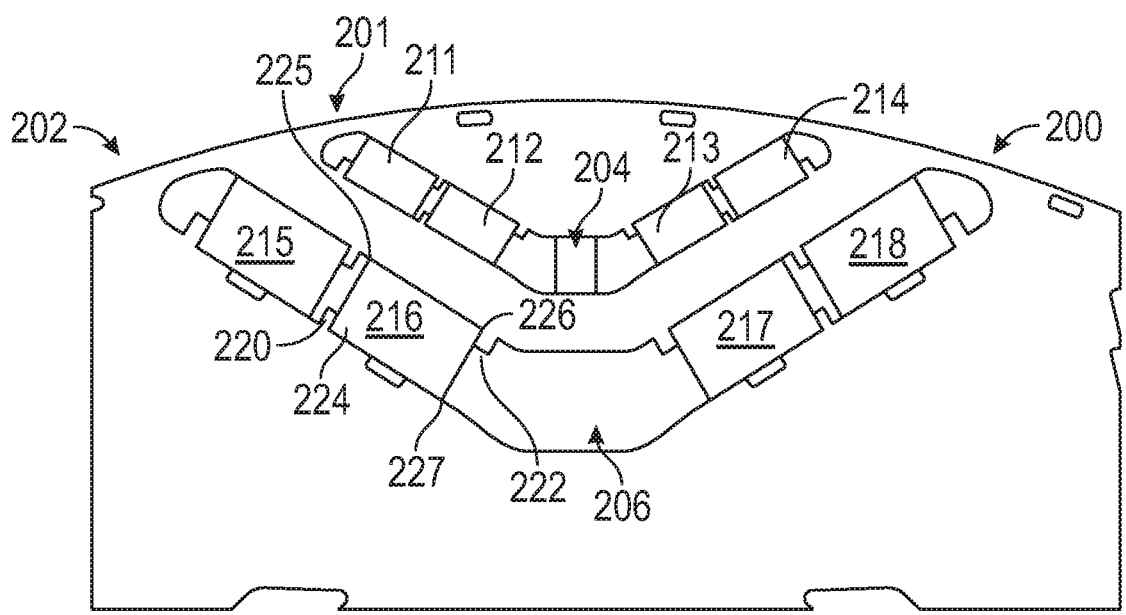
FIG. 10 is a fragmentary illustrations of the rotor of FIG. 2, in accordance with various embodiments.

Referring to FIG. 10, an embodiment is depicted that enables eliminating or obviating struts such as the struts 91, 92 of FIG. 6. The rotor assembly 200 includes two layers 201, 202 of flux barriers in the form of magnet cavities 204, 206. The magnet cavity 204 contains four magnets 211-214 and the magnet cavity 206 contains four magnets 215-218. Each of the magnets 211-218 is retained by a pair of beams that extend into its respective cavity 204, 206. For example, the magnet 216 is retained by beams 220, 222 that engage the magnet 216 at non-adjacent corners 224, 226. The corners 225, 227 do not have engaged beams. The magnets 211-215 and 217-218 are similarly retained by their respective beams. In the case of each of the magnets 211-218, retention is at a pair on non-adjacent corners where one of the non-adjacent corners is at a junction of a radially inward facing side and a radially outward facing side, and the other of the non-adjacent corners is at a junction of a different radially inward facing side and a different radially outward facing side. As compressive structural elements, the magnets 211-218 apply forces on the rotor assembly 200 that have radially inward directed components and assist in offsetting centrifugal forces sufficiently to obviate a need for struts. Eliminating struts improves the magnet performance of the rotor assembly 200.

Figure 11:
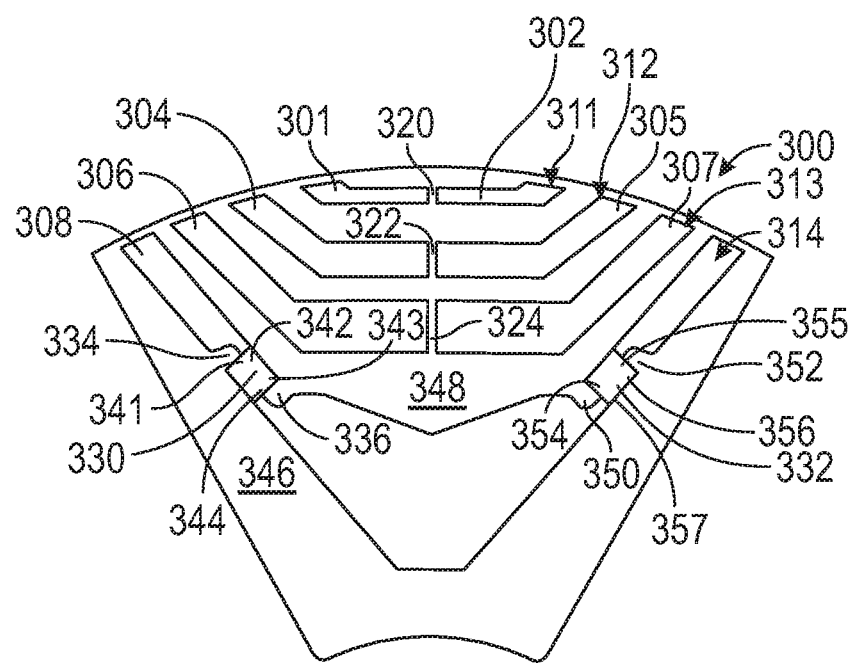
FIG. 11 is a fragmentary illustration of the rotor of an SR machine, in accordance with various embodiments.

FIG. 11 illustrates a cross section of a rotor assembly 300 for an SR motor. It will be understood that one sector of the rotor assembly 300 is shown with one grouping of cavities, and that additional sectors of the rotor assembly 300 will include additional cavity groups defining the poles around the circumference of the rotor assembly 300. In this example, the cavities do not require magnets and so they are referred to as flux barrier cavities 301-308. The flux barrier cavities 301-308 are configured in four layers 311-314. The layer 311 includes the flux barrier cavities 301, 302, which are separated by a strut 320. The layer 312 includes the flux barrier cavities 304, 305, which are separated by a strut 322. The layer 313 includes the flux barrier cavities 306, 307, which are separated by a strut 324. The layer 314 includes the one contiguous flux barrier cavity 308, which is vee shaped. The layer 314 does not include a strut, and instead contains two compressive structural elements 330, 332. The compressive structural elements 330, 332 are made of a non-magnetic material and in the current embodiment each comprise a bar of a ceramic material.

The compressive structural element 330 is retained by beams 334, 336 engaging its non-adjacent corners 341, 343. The corners 342, 344 do not engage retaining wall features. The beam 334 extends into the flux barrier cavity 308 from the flux element 346 on the radial inside of the flux barrier cavity 308 and the beam 336 extends into the flux barrier cavity 308 from the flux element 348 on the radial outside of the flux barrier cavity 308. The compressive structural element 330 is compressed between the beams 334, 336 and as a result applies a force to the beam 336. The compressive structural element 330 is strategically placed to apply a force to the flux path element 348 with a radially inward directed component to offset centrifugal forces on the flux path element 348. The compressive structural element 330 may apply a force to the beam 334 with a radially outward directed component, however, the beam 334 is connected with a substantial structural part of the rotor assembly 300 and so the force does not jeopardize structural integrity. Notable, is that the flux barrier cavity 308 and its layer 314 have the largest open cross sectional size of the flux barrier cavities 310-308/layers 311-314, and do not require a strut.

The compressive structural element 332 is similarly retained by beams 350, 352 engaging its non-adjacent corners 354, 356. The corners 355, 357 do not engage retaining wall features. The beam 350 extends into the flux barrier cavity 308 from the flux element 348 on the radial outside of the flux barrier cavity 308 and the beam 352 extends into the flux barrier cavity 308 from the flux element 346 on the radial inside of the flux barrier cavity 308. The compressive structural element 332 is compressed between the beams 350, 352 and as a result, applies a force to the beam 350. The compressive structural element 332 is strategically placed to apply a force to the flux path element 348 with a radially inward directed component to offset centrifugal forces on the flux path element 348. The compressive structural element 332 may apply a force to the beam 352 with a radially outward directed component, however, the beam 352 is connected with a substantial structural part of the rotor assembly 300 and so the force does not jeopardize structural integrity.

Figure 12:
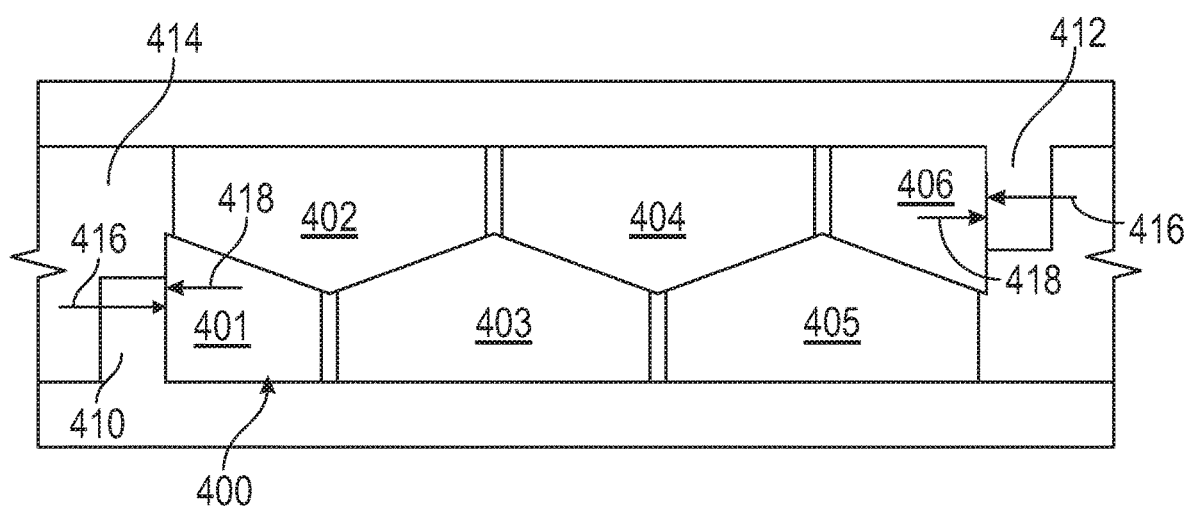
FIG. 12 is a cross sectional illustration of a segmented, multi-piece compressive structural element, in accordance with various embodiments.

With reference to FIG. 12, it will be understood that the magnets/compressive structural elements of the current disclosure may each comprise a segmented assembly of a number of pieces. For example, using a segmented assembly may desirably reduce eddy currents as compared to a one-piece magnet. The use of a segmented compressive structural element enables a method of applying the preload to the compressive structural element. In the example of FIG. 12, the compressive structural element 400 comprises six segments 401-406 each with a pentagonal or truncated pentagonal (trapezoidal) shape to fill the space between the beams 410, 412 in the flux barrier cavity 414. The segments 401-406 are inserted into the stacked laminations of the rotor assembly, such as by sliding them into the flux barrier cavity 414 prior to the addition of at least one of the end caps (FIG. 1). The trapezoidal shaped segments 401, 406 wedge between the pentagonal shaped segments 402-405 and the beams 410, 412 compressing the compressive structural element 400 and the beams 410, 412 applying a load 416. In reaction, the compressive structural element 400 applies a preload 418 to the beams 410, 412 for offsetting centrifugal forces. In other embodiments, the beams 410, 412 may be elastically deformable such that a press fit may be applied between an oversized compressive structural element and its retaining wall features. For example, the wall features may be made of a steel material that elastically deforms. For example, the magnet 123 of FIG. 6 may be sized so that a press fit is required to slide it into the magnet cavity 84 between the beams 163, 164, which may deform sufficiently to allow insertion and may then attempt to return to their original shape applying a preload to the magnet 123. In either preloading method, the wedging action or the interference fit may be designed to result in a specific amount of preload 418 to offset a desired amount of centrifugal force.

Accordingly, compressive structural elements enable increasing electric machine performance/operating speed without increasing bridge/strut size, enable structural member size reduction/elimination thereby increasing magnetic performance. The compressive structural elements are compressible between wall features to transfer loads through the compressive structural elements into heavier structural parts of the rotor. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A rotor for an electric machine comprising:
a rotor core with a lamination stack of individual laminations between ends of the rotor core, the rotor core having at least one cavity internal to the rotor core, the at least one cavity surrounded by a wall defined by the rotor core, the lamination stack having a length between the ends; and
a structural element disposed in the at least one cavity and compressible between a first wall feature and a second wall feature,
wherein the first and second wall features comprise beam-like structures formed by aligned tabs of the individual laminations in the lamination stack, the beam-like structures running the length of the lamination stack,
wherein a preload is established between the first and second wall features and the structural element.

2. The rotor of claim 1, wherein the structural element comprises a magnet, wherein the magnet is configured to provide a load path between the beam-like structures so the magnet applies a reaction force to the beam-like structures with a radially directed component to offset centrifugal forces on the rotor core.

3. The rotor of claim 1, wherein the structural element comprises a non-magnetic material.

4. The rotor of claim 1, wherein the structural element includes a number of sides defining corners, and wherein the first and second wall features comprise beams that engage the structural element at two of the corners that are nonadjacent to each other, wherein nonadjacent means not having any of the number of sides in common.

5. The rotor of claim 4, wherein the non-adjacent of the corners comprise a first corner disposed at a junction of a first radially inward facing side and a first radially outward facing side, and a second corner disposed at a junction of a second radially inward facing side and a second radially outward facing side.

6. The rotor of claim 1, wherein the structural element comprises a number of segments that wedge against the first and second wall features to establish the preload.

7. The rotor of claim 6, wherein the segments comprise pentagonal and trapezoidal shapes.

8. The rotor of claim 1, wherein the wall features comprise a deformable material and the structural element is press fit between the wall features to establish the preload.

9. The rotor of claim 2, comprising a plurality of cavities, wherein the cavities are in-part defined by struts and bridges and wherein the structural element is configured, via the reaction force, to offset, all along the length, loads otherwise carried by the struts and bridges.

10. The rotor of claim 1, wherein at least one of the structural element and the rotor induces a wedging action on the structural element.

11. A rotor for an electric machine comprising:
a rotor core having a plurality of cavities internal to the rotor core, wherein the cavities define poles of the rotor;
a first wall feature and a second wall feature each defined by the rotor core and each extending into one of the plurality of cavities;
a structural element compressed between the first and second wall features,
wherein a preload is established between the first and second wall features and the structural element,
wherein the cavities are arranged in a number of layers and a strut extends through at least one of the layers to support the rotor core,
wherein the structural element is disposed in one of the layers that has a larger open cross sectional area than the others of the layers, wherein the one of the layers with the structural element does not include the strut.

12. The rotor of claim 11, wherein the structural element is configured to provide a load path between the first wall feature and the second wall feature so the structural element applies a reaction force to the first wall feature and the second wall feature with a radially directed component to offset centrifugal forces on the rotor core.

13. The rotor of claim 12, wherein the first wall feature comprises a first structural beam and the second wall feature comprises a second structural beam.

14. The rotor of claim 11, wherein the structural element comprises a magnet.

15. The rotor of claim 11, wherein the structural element comprises a non-magnetic material.

16. The rotor of claim 11, wherein:
the structural element includes a number of sides defining corners, and
the first and second wall features comprise beams the engage the structural element at two of the corners that comprise a first corner disposed at a junction of a first radially inward facing side and a first radially outward facing side, and a second corner disposed at a junction of a second radially inward facing side and a second radially outward facing side, wherein the two of the corners are nonadjacent one another.

17. The rotor of claim 11, wherein:
the structural element comprises a number of segments that wedge against the first and second wall features to establish the preload, and
at least one of the segments comprises a trapezoidal shape.

18. The rotor of claim 11, wherein the wall features comprise a deformable material and the structural element is press fit between the beams to establish the preload.

19. The rotor of claim 11, wherein the cavities are in-part defined by struts and bridges and wherein the structural element is configured to offset loads otherwise carried by the struts and bridges.

20. A rotor for an electric machine comprising:
a rotor core having a plurality of cavity groupings internal to the rotor core, wherein the cavity groupings each includes plural of the cavities and define poles of the rotor;
at least one strut in each of the cavity groupings for support of the rotor core;
a first feature and a second feature defined by the rotor core and each extending into at least one of the cavities; and
a structural bar compressed between the first and second features,
wherein a preload is established between the features and the bar, the preload resulting in the structural bar applying a radially inward directed force to the rotor core to offset centrifugal loads on the strut,
wherein the structural bar comprises a number of segments that wedge against the first and second features to establish the preload.

* * * * *